M. BARTLEY.
NUT LOCK.
APPLICATION FILED SEPT. 4, 1915.
1,198,515.
Patented Sept. 19, 1916.
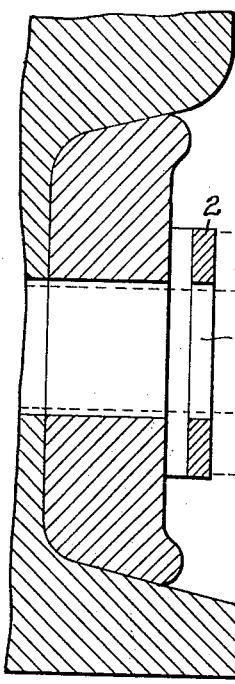
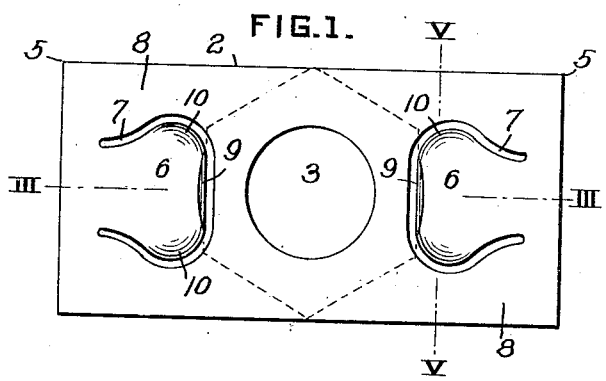
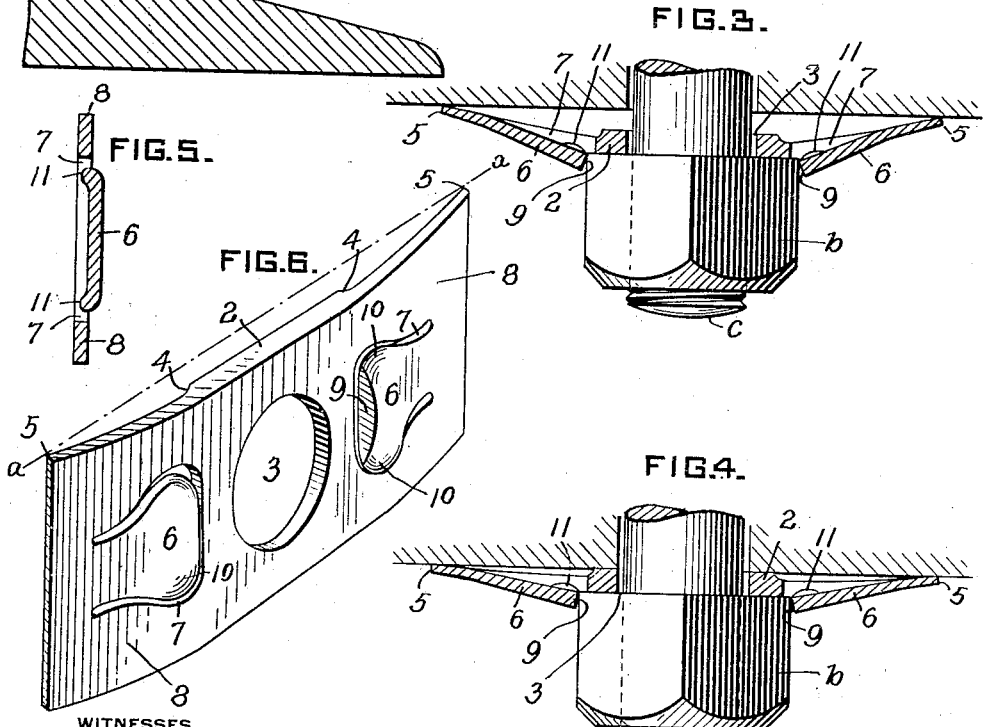
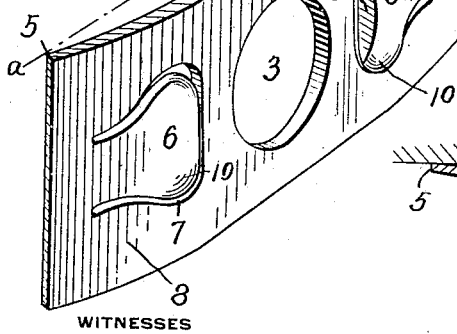
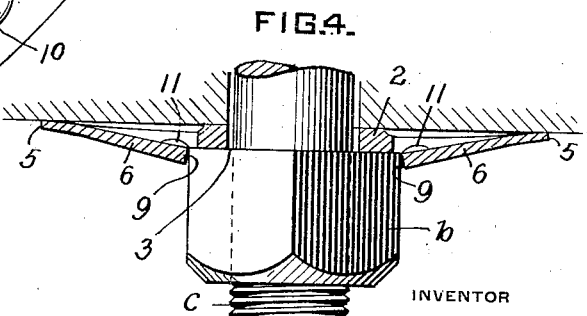
WITNESSES
INVENTOR

UNITED STATES PATENT OFFICE.

MILTON BARTLEY, OF PITTSBURGH, PENNSYLVANIA, ASSIGNOR TO WILLIAM W. FORD, OF PITTSBURGH, PENNSYLVANIA.

NUT-LOCK.

1,198,515.  Specification of Letters Patent.  Patented Sept. 19, 1916.

Application filed September 4, 1915. Serial No. 49,031.

*To all whom it may concern:*

Be it known that I, MILTON BARTLEY, a citizen of the United States, residing at Pittsburgh, in the county of Allegheny and State of Pennsylvania, have invented certain new and useful Improvements in Nut-Locks, of which the following is a specification.

My invention relates to improvements in nut locks, and is designed to provide a device of this type which may be economically manufactured from a rolled metal blank, having a main body portion punched out for passage of the bolt, and laterally arranged wing extensions having integral resilient lug portions, bent outwardly from the body portion of the lock, at one or both sides of the central opening, and adapted to engage the side or sides of the nut.

The nut lock is made of a blank of a cross section adapted to provide for the bowing out of the main middle portion, between its terminal edges, so that it may be compressed in the action of screwing the nut on a bolt, and will by its main body portion exert an outward spring tension against the nut, in addition to the individual spring tension and holding action of the individual lug or lugs.

The device is adapted to the positive holding of the nut, when screwed to position, and to permit of the turning of the corners of the nut over the resilient locking lugs, in screwing, and to permit of unscrewing of the nut in the same manner, without impairment of the holding efficiency.

One preferred embodiment of the device is illustrated in the accompanying drawings, in which—

Figure 1 is a view of the nut lock in front elevation, indicating the nut in position thereon in dotted lines. Fig. 2 is a partial sectional view through a portion of a rail and fish plate, showing the application of the nut lock to a bolt and nut. Fig. 3 is a horizontal sectional view through the nut lock, indicated by the section line III. III. of Fig. 1, and showing it in operative position and resiliently extended prior to tightening the nut to holding position. Fig. 4 is a similar view, showing the nut screwed down to place and compressing the nut lock beneath it. Fig. 5 is a cross sectional detail view, indicated by the line V. V. of Fig. 1.

Fig. 6 is a perspective view of the nut lock, detached.

The nut lock, or locking washer, is formed from a rectangular blank, which is preferably sheared from a continuously rolled section of steel, having a middle maximum thickness, preferably uniform, for about one-third of the length of the lock, off-set inwardly at the under side, and tapering therefrom toward each end, whereby to provide the desired resiliency and compressibility of the lock itself against any suitable surface, as the face of an ordinary fish plate.

Referring to Fig. 6, showing the complete lock, the middle body portion 2 is provided with the central bolt hole 3, through its uniform thickest portion, beyond which, from the points 4, 4, the wings 8 extend. The gage of the metal is considerably thinner beyond these points, being offset at one side and gradually tapering in thickness toward the opposite terminal edges 5, 5. The body portion of the lock, as thus shaped, is slightly bowed, so as to arrange the inner edges of the terminals 5 inwardly beyond the inner face of the middle body portion 2, as indicated by the line $a$, $a$, Fig. 6, so that under compression of the nut the middle body portion may be pressed inwardly against the surface of the fish plate, or the like, and into alinement with the plane $a$, $a$. The nut lock, being tempered to the desired degree, will thus, by its main body portion, exert a considerable pressure outwardly against the nut, tending to hold it against rotation.

At one or both sides of the bolt hole 3 is a resilient lug or locking ear 6, partly severed from the metal of the main body portion by a punch opening 7. In form, the lug 6 is, as shown, widest at its inner portion toward the bolt, the integral connection with the outer portion of the nut lock plate being narrower, as desired, according to the spring action, temper of the steel, and other conditions controlling the manufacture of the lock, as to its intended use.

Due to the tapering formation of the wing extensions 8, the inner edge 9 of lug 6 is of substantial thickness and adapted to engage against the straight face of the nut $b$ as it is screwed upon bolt $c$, giving ample holding engagement. Lug 6 is pressed outwardly beyond the general plane of the main body portion of the lock, as clearly shown in Figs. 3 and 4, so that the inner edge 9 extends for practically its entire depth, beyond the general face of the lock, which arrangement is maintained at all positions.

The corners of lug 6 are rounded, as indicated at 10, 10, the surplus metal in the operation of rounding by dies being pressed inwardly beyond the inner surface, at each corner, as indicated at 11. The corners being thus rounded, leaving the intervening edge face 9 square throughout its middle portion, the turning of the nut in either direction, either in screwing or unscrewing, will facilitate the depression of the lug to a degree, allowing the corners to ride over the lug until the flat face of the nut is seated against face 9, whereupon the lug will spring outwardly to normal position, and will hold the nut in place. This operation may be effected each time a hexagon nut is turned one-sixth, or a square nut one-quarter of a revolution. It provides for forcible removal of the nut at any time, while constantly maintaining a positive locking engagement against accidental movement or loosening.

The operation of the device will be readily understood from the foregoing description. Its especial advantage resides in the positiveness of engagement against the nut, the facility for depression by the nut upon rotation of each face thereof, and engagement of the straight face or edge; the device is economical of manufacture without much waste, and is very efficient in service.

What I claim is:

1. A nut lock consisting of a washer plate having a bolt hole and an integral resilient outwardly deflected locking tongue extending inwardly toward the bolt hole and having laterally widened rounded corners.

2. A nut lock consisting of a washer plate having a bolt hole and an integral resilient outwardly deflected locking tongue extending inwardly toward the bolt hole provided with a middle bearing edge facing toward the bolt hole and laterally widened rounded corners.

3. A nut lock consisting of a washer plate having a bolt hole and integral resilient outwardly deflected locking tongues extending inwardly toward the bolt hole, and having laterally widened rounded corners.

4. A nut lock consisting of a washer plate having a bolt hole and integral resilient outwardly deflected locking tongues extending inwardly toward the bolt hole, each provided with a middle bearing edge facing toward the bolt hole and laterally widened rounded corners.

5. A nut lock consisting of a washer plate having a bolt hole and an integral partly severed resilient locking tongue provided with a bearing shoulder adjacent and facing toward the bolt hole extending beyond the face of the plate and rounded on the corners.

6. A nut lock consisting of a washer plate having a centrally apertured middle body portion of maximum thickness, lateral tapering resilient extensions at each side of said middle portion bowed beyond the plane thereof embodying a partly severed integral resilient locking tongue having a nut-engaging shoulder extending beyond the face of said extension and facing toward the central aperture.

7. A nut lock consisting of a washer plate having a centrally apertured middle body portion of maximum thickness and lateral tapering resilient extensions at opposite sides of said middle portion bowed beyond the plane thereof embodying a partly severed integral resilient locking tongue extending beyond the face of said extension, said tongue having at its middle terminal portion a nut engaging shoulder facing toward the central aperture and a rounded corner at each side thereof.

8. A nut lock consisting of a washer plate having a centrally apertured middle body portion of maximum thickness, lateral tapering resilient extensions at each side of said middle portion bowed beyond the plane thereof each embodying a partly severed integral resilient locking tongue having a nut-engaging shoulder disposed toward the middle of the plate and extending beyond the face thereof and rounded at the corners whereby to facilitate depressing movement of a nut thereover.

9. A nut-locking washer having a concave inner face, an opposite bearing face, and resilient locking tongues extending beyond the washer at each side of its center and having inwardly disposed nut-engaging edges.

10. A nut-locking washer having a concave inner face, an opposite bearing face, a central bolt hole, and resilient locking tongue extending beyond the washer at each side of the bolt hole having inwardly disposed nut-engaging shoulders and rounded corners.

11. A nut-locking washer having a concave inner face, an opposite bearing face, and integral resilient depressible locking tongues having inwardly disposed terminals extending beyond the face of the washer at each side of its middle portion.

In testimony whereof I hereunto affix my signature in the presence of two witnesses.

MILTON BARTLEY.

Witnesses:
W. A. HECKMAN,
C. M. CLARKE.